US009959749B2

(12) United States Patent
Sogabe

(10) Patent No.: US 9,959,749 B2
(45) Date of Patent: May 1, 2018

(54) VEHICULAR ASSISTANCE DEVICE, PROGRAM PRODUCT, AND ASSISTANCE INFORMATION RECEPTION METHOD

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/033,052

(22) PCT Filed: Oct. 17, 2014

(86) PCT No.: PCT/JP2014/005269
§ 371 (c)(1),
(2) Date: Apr. 28, 2016

(87) PCT Pub. No.: WO2015/064042
PCT Pub. Date: May 7, 2015

(65) Prior Publication Data
US 2016/0247388 A1 Aug. 25, 2016

(30) Foreign Application Priority Data
Nov. 1, 2013 (JP) ................................ 2013-228414

(51) Int. Cl.
*G08C 17/02* (2006.01)
*H04W 4/02* (2018.01)
(Continued)

(52) U.S. Cl.
CPC .......... *G08C 17/02* (2013.01); *B60C 23/0438* (2013.01); *B60C 23/0479* (2013.01);
(Continued)

(58) Field of Classification Search
CPC . G08C 17/02; B60C 23/0438; B60C 23/0479; G01C 21/3697
See application file for complete search history.

(56) References Cited

U.S. PATENT DOCUMENTS 5,917,811 A * 6/1999 Weaver, Jr. ........... H04W 36/32 370/332
6,518,877 B1 * 2/2003 Starkey ................ B60C 23/004 340/447
8,315,905 B1 * 11/2012 Adair ................ G06Q 30/0261 379/93.12
8,430,310 B1 * 4/2013 Ho ......................... G06F 21/35 235/382
8,744,412 B1 * 6/2014 Cazanas ................. H04W 4/12 340/426.1
8,755,792 B2 * 6/2014 Hirano ................. H04W 12/08 455/41.3
2006/0116965 A1 * 6/2006 Kudo ..................... G06Q 99/00 705/52
(Continued)

FOREIGN PATENT DOCUMENTS

JP 2005346413 A 12/2005

*Primary Examiner* — Joseph Feild
*Assistant Examiner* — Willard Edwards, Jr.
(74) *Attorney, Agent, or Firm* — Harness, Dickey & Pierce, P.L.C.

(57) ABSTRACT

A vehicular assistance device, which is equipped to a vehicle and performs a wireless communication with a facility-side device to receive assistance information useful to a user from the facility-side device, includes a facility ID reception portion receiving a facility ID used for identifying a facility from the facility-side device, an area information acquisition portion acquiring area information related to a position of the facility, a position information acquisition portion acquiring position information of the vehicle, a determination portion determining whether the received facility ID is valid based on the position information of the vehicle and the area information related to the facility corresponding to the received facility ID, and a user ID transmission portion, when the facility ID is valid, transmitting, to the facility-side device, a user ID used for identifying the user as a request for transmitting the assistance information.

8 Claims, 4 Drawing Sheets

(51) Int. Cl.

| | |
|---|---|
| ***H04W 4/04*** | (2009.01) |
| ***H04W 12/08*** | (2009.01) |
| ***G01C 21/36*** | (2006.01) |
| ***G08G 1/017*** | (2006.01) |
| ***G08G 1/14*** | (2006.01) |
| ***B60C 23/04*** | (2006.01) |
| ***G07C 9/00*** | (2006.01) |

(52) U.S. Cl.
CPC ..... *G01C 21/3697* (2013.01); *G07C 9/00031* (2013.01); *G08G 1/017* (2013.01); *G08G 1/143* (2013.01); *G08G 1/144* (2013.01); *G08G 1/146* (2013.01); *H04W 4/02* (2013.01); *H04W 4/04* (2013.01); *H04W 4/046* (2013.01); *H04W 12/08* (2013.01)

(56) References Cited

U.S. PATENT DOCUMENTS

| | | | | | |
|---|---|---|---|---|---|
| 2007/0288748 | A1* | 12/2007 | Kakiuchi | G06F 21/316 | 713/159 |
| 2008/0014909 | A1* | 1/2008 | Shimomura | G07C 5/008 | 455/414.1 |
| 2010/0332118 | A1* | 12/2010 | Geelen | G01C 21/32 | 701/533 |
| 2011/0106426 | A1* | 5/2011 | Tertoolen | G01C 21/3476 | 701/533 |
| 2011/0295709 | A1* | 12/2011 | Kubo | G06Q 30/0601 | 705/26.1 |
| 2014/0256256 | A1* | 9/2014 | Park | H04W 36/14 | 455/41.1 |

* cited by examiner

VEHICULAR ASSISTANCE DEVICE, PROGRAM PRODUCT, AND ASSISTANCE INFORMATION RECEPTION METHOD

CROSS REFERENCE TO RELATED APPLICATIONS

This application is a U.S. National Phase Application under 35 U.S.C. 371 of International Application No. PCT/JP2014/005269 filed on Oct. 17, 2014 and published in Japanese as WO 2015/064042 A1 on May 7, 2015. This application is based on and claims the benefit of priority from Japanese Patent Application No. 2013-228414 filed on Nov. 1, 2013. The entire disclosures of all of the above applications are incorporated herein by reference.

TECHNICAL FIELD

The present disclosure relates to a vehicular assistance device, a program product, and an assistance information reception method, each of which performs a wireless communication with a facility-side device installed at a facility to receive assistance information useful to a user from the facility-side device.

BACKGROUND ART

Conventionally, there is known a parking area system that aims at enabling effective use of a parking area provided together with a shop. The parking area system is configured so that, when a vehicle approaches a facility (e.g., parking area or shop), an in-vehicle device transmits a user ID, which is used for identifying a user, to a facility-side device. When the facility-side device confirms the user ID, the facility-side device transmits information associated with the user to the in-vehicle device. For example, the information associated with a user includes information to provide leading customers with special parking spaces, special benefit information, and information from shops that meet preferences of users extracted from the Internet usage history (e.g., see patent literature 1). In the description below, these kinds of information will be referred to as assistance information because the information is useful to users (that is, the information supports users).

The prior-art parking area system may allow the in-vehicle device to transmit a user ID to an invalid access point (hereinafter referred to as an "unauthorized access point") in response to a transmission request from the unauthorized access point. The user ID also provides, to the unauthorized access point, information capable of specifying behavior of the user or the vehicle. The information may be abused by a third party that installed the unauthorized access point.

PRIOR ART LITERATURES

Patent Literature

[Patent Literature 1] JP 2005-346413 A

SUMMARY OF INVENTION

In view of the foregoing difficulties, it is an object of the present disclosure to provide a vehicular assistance device, a program product, and an assistance information reception method, each of which is capable of suppressing the information from leaking to a third party from the vehicular assistance device which receives the assistance information from a facility-side device.

According to an aspect of the present disclosure, a vehicular assistance device, which is equipped to a vehicle, includes a facility ID reception portion, an area information acquisition portion, a position information acquisition portion, a determination portion, and a user ID transmission portion. The vehicular assistance device performs a wireless communication with a facility-side device that transmits assistance information useful to a user, and the vehicular assistance device receives the assistance information from the facility-side device.

The facility ID reception portion receives a facility ID from the facility-side device. Herein, the facility ID is used for identifying a facility to which the facility-side device is installed.

The area information acquisition portion acquires area information related to a position of the facility.

The position information acquisition portion acquires position information of the vehicle.

The determination portion, when the facility ID reception portion receiving the facility ID from the facility-side device, determines whether the received facility ID is valid or not based on the position information of the vehicle and the area information that is related to the position of the facility corresponding to the received facility ID.

The user ID transmission portion, under a condition that the determination portion determines that the received facility ID is valid, transmits, to the facility-side device, a user ID as a request for transmitting the assistance information, and the user ID being used for identifying the user.

With the above configuration, in a case where an invalid access point transmits a facility ID to the vehicular assistance device, the position of the facility based on the facility ID may be determined to differ from the current position of the vehicle in the vehicular assistance device. In such a case, the vehicular assistance device does not transmit the request (containing user ID) requiring transmitting of the assistance information to the unauthorized access point.

Thus, in the vehicular assistance device which receives the assistance information from the facility-side device, information leakage to a third party can be suppressed. For example, in the vehicular device according to the present disclosure, when the current position of the vehicle is determined to be included in the setup range including the position of the facility identified by the received facility ID, the facility is determined to be the valid facility. Thus, the vehicular assistance device does not transmit a request (containing user ID) requiring a transmitting of the assistance information to any one unauthorized access point outside the setup range. This can appropriately prevent the information from leaking to a third party.

According to a second aspect of the present disclosure, a program product, which is stored in a non-transitory tangible computer readable storage medium and can be distributed to the market, includes instructions performed by a computer for controlling the computer to function as the facility ID reception portion, the area information acquisition portion, the position information acquisition portion, the determination portion, and the user ID transmission portion included in the vehicular assistance device according to the first aspect of the present disclosure.

With the above program product, advantages similar to the advantages provided by the vehicular assistance device according to the first aspect of the present disclosure can be provided.

According to a third aspect of the present disclosure, an assistance information reception method, which enables a vehicular assistance device equipped to a vehicle to perform a wireless communication with a facility-side device, is provided. The facility-side device transmits assistance information useful to a user and the vehicular assistance device receives the assistance information from the facility-side device. The assistance information reception method includes a facility ID reception step receiving a facility ID from the facility-side device and the facility ID being used for identifying a facility to which the facility-side device is installed, an area information acquisition step acquiring area information related to a position of the facility, a position information acquisition step acquiring position information of the vehicle, a determination step, when the facility ID is received from the facility-side device in the facility ID reception step, determining whether the received facility ID is valid or not based on the position information of the vehicle and the area information that is related to the position of the facility corresponding to the received facility ID, and a user ID transmission step, under a condition that the received facility ID is determined to be valid in the determination step, transmitting, to the facility-side device, a user ID as a request for transmitting the assistance information and the user ID being used for identifying the user.

With the above assistance information reception method, advantages similar to the advantages provided by the vehicular assistance device according to the first aspect of the present disclosure can be provided.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe a parking area system 1 as an embodiment of a vehicular system including a vehicular assistance device according to the present disclosure with reference to the accompanying drawings.

<Overall Configuration>

Figure 1A:
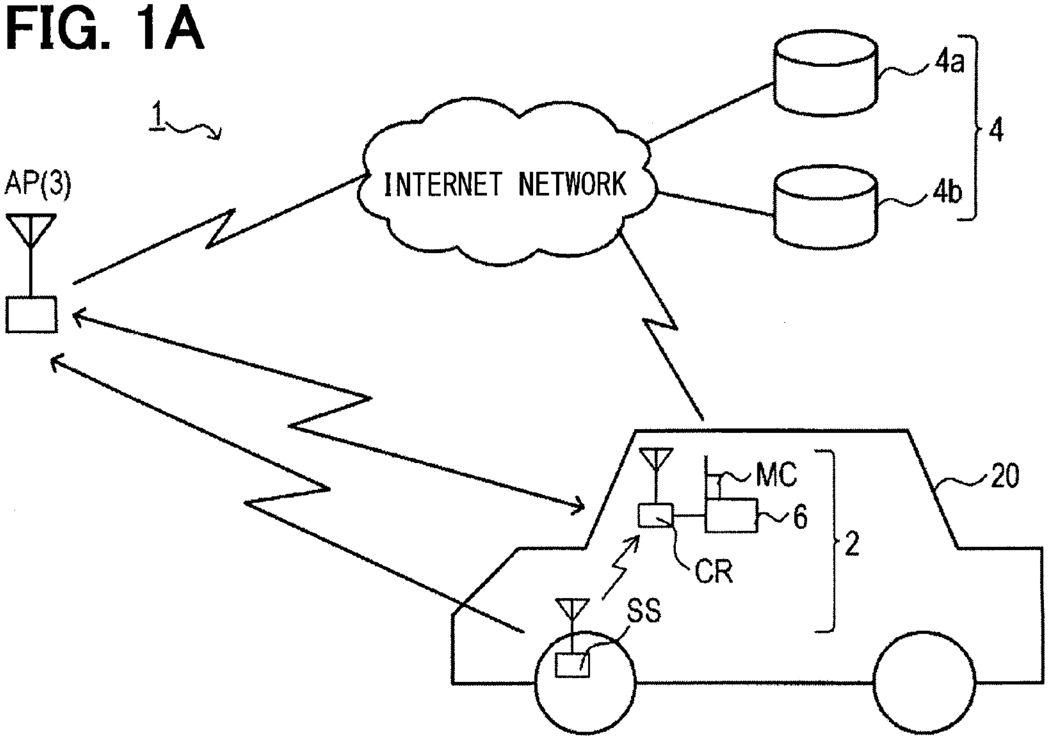
FIG. 1A is a diagram illustrating an entire configuration of a system including a vehicular assistance device.
Figure 1B:
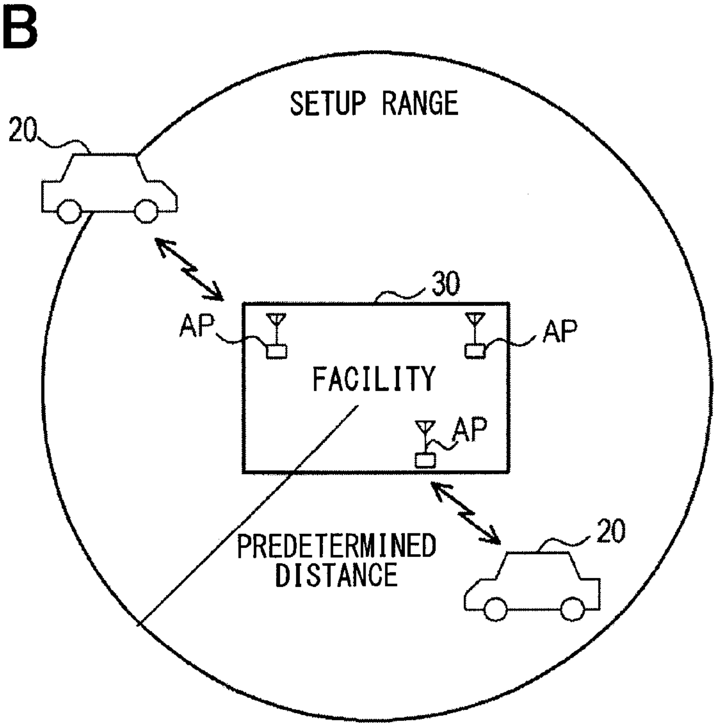
FIG. 1B is a diagram illustrating a setup range of a facility.

As illustrated in FIGS. 1A and 1B, the parking area system 1 according to the present embodiment includes a vehicular assistance device 2 equipped to a vehicle 20, a facility-side device 3 installed at a facility 30, and a server 4 provided on the Internet.

In the parking area system 1, the facility-side device 3 transmits assistance information or information useful to users (i.e., information to support users) to the vehicular assistance device 2 by performing a wireless communication between the vehicular assistance device 2 and the facility-side device 3. For example, the assistance information includes information to provide leading customers with special parking spaces, special benefit information, and information from shops that meet preferences of users extracted from the Internet usage history. Providing such information to users can give favors to the users and improve an ability to attract more customers to the facility 30.

In the parking area system 1 according to the present embodiment, when the vehicle 20 enters a range within a predetermined distance approximately around a position of the facility 30, the facility-side device 3 transmits the assistance information to the vehicular assistance device 2, which is equipped to the vehicle 20. The assistance information is notified to a user (e.g., a driver) of the vehicle 20 who passes by an area near the facility 30 before passing by the facility. Thus, it is expected that the user may be attracted by the information and guided to the facility 30. A manager of the facility 30 can freely set the predetermined distance within which the assistance information is distributed. Setting the predetermined distance prescribes a range of place that contains the position of the facility 30 and is capable of transmitting the assistance information from the facility-side device 3 to the vehicular assistance device 2. This range is hereinafter referred to as a "setup range."

For example, the facility 30 has a shopping mall tenanted by several shops and the shopping mall is provided with a parking area. According to the present embodiment, several access points AP are provided at predetermined points in the outdoor parking area. Access point AP is provided to exchange various kinds of information with the vehicular assistance device 2 based on communication (hereinafter referred to as Near Field Communication) using Near Field Communication standards such as WiFi (registered trademark) or Bluetooth (registered trademark). Access point AP is included in the facility-side device 3.

The vehicle 20 is equipped with a tire pressure monitoring system (hereinafter referred to as "TPMS"). In the vehicle 20, direct TPMS is used. Specifically, sensor transmitter SS is installed inside a tire or a wheel. Sensor transmitter SS detects an air pressure or a temperature of the tire. Information (hereinafter referred to as "tire air pressure information") indicating a detection result is periodically and wirelessly transmitted to a communication unit CR disposed in the vehicle. According to the present disclosure, sensor transmitter SS functions as a tire air pressure information transmission portion.

In the vehicle, for example, the communication unit CR is connected to a navigation system 6 included in the vehicular assistance device 2. The navigation system 6 may determine that the air pressure does not satisfy a reference value, based on the tire air pressure information received via communication unit CR. In such a case, the navigation system 6 alerts a user using a display device or an audio output device (unshown). As part of Near Field Communication, access point AP is configured to be able to receive the tire air pressure information transmitted from the sensor transmitter SS. The tire air pressure information simply indicates the air pressure, the temperature, or the location of a tire. In the present disclosure, suppose that the tire air pressure information does not contain information related to the user or the vehicle 20. The navigation system 6 is connected with the mobile communication unit MC, which is connected to a mobile telephone network (unshown). The mobile communication unit MC is able to connect to the Internet network through the mobile telephone network. Thus, users can browse through homepages available on the Internet, for example.

The server 4 includes a center server 4*a* and a facility server 4*b*.

The facility server 4*b* publishes a homepage of the facility 30 on the Internet. The homepage of the facility 30 is published as an EC site and contains various information related to shops such as merchandise supplied from the shops in the facility 30. When log in to the homepage of the facility 30, a user may browse through web pages using the navigation system 6 or various terminals such as a mobile phone, a smartphone, and a PC. Then, the terminal transmits information (hereinafter referred to as "browse information") indicating the user's browsing action to the facility server 4*b*. The facility server 4*b* receives the browse information from the user's terminal and stores the Internet usage history based on the browse information corresponding to a user ID. The user ID provides information to identify the user and may be used to log in to the homepage of the facility 30. The user's terminal transmits the user ID together with the browse information to the facility server 4*b*.

The center server 4*a* collects information needed to operate the parking area system 1. The center server 4*a* stores information (hereinafter referred to as "area information") indicating the setup range and setup intensity (to be described later) in addition to the assistance information as a database corresponding to each facility 30 (facility ID to be described later). A facility manager is in charge of updating the assistance information and the area information. The center server 4*a* preliminarily registers information related to a user such as the user ID. The information related to users is hereinafter referred to as "user information." The user information contains a telephone number assigned to mobile communication unit MC as well as the user ID. When the facility manager updates the area information, the center server 4*a* transmits an update request (to be described later) to all mobile communication units MC contained in the user information. The center server 4*a* can acquire information such as the Internet usage history concerning each user from the facility server 4*b* via the Internet network and store the acquired information.

<Configurations of the Vehicular Assistance Device and the Facility-Side Device>

The description below explains configurations of the vehicular assistance device 2 and the facility-side device 3 according to the present embodiment.

Figure 2:
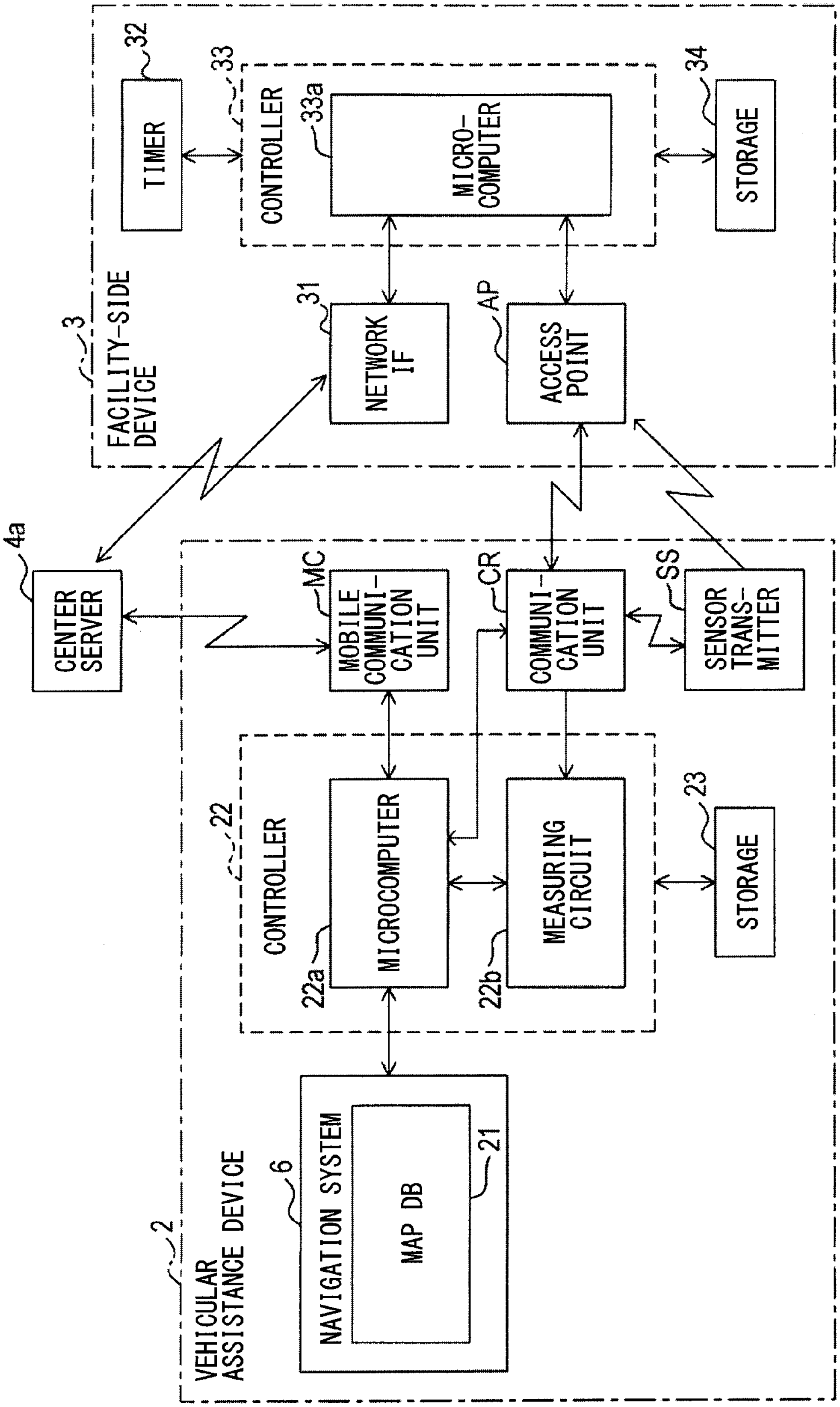
FIG. 2 is a block diagram illustrating a configuration of the vehicular assistance device and a facility-side device.

As illustrated in FIG. 2, the vehicular assistance device 2 according to the present embodiment includes a map database (hereinafter referred to as a "map DB") 21, a controller 22, and a storage 23 in addition to the navigation system 6, the sensor transmitter SS, the communication unit CR, and the mobile communication unit MC described above.

The navigation system 6 detects a position of the vehicle 20 based on a positioning signal from a positioning satellite included in GPS and a detection signal from a distance sensor or a gyroscope. The navigation system 6 also calculates a route to a user-specified destination based on map data stored in the map DB 21 and performs a known navigation process for route guidance. The navigation system 6 supplies the controller 22 with position information indicating a current position of the vehicle 20 in response to a request from the controller 22.

The communication unit CR supplies the navigation system 6 with the tire air pressure information received from the sensor transmitter SS. The communication unit CR uses Near Field Communication so as to be capable of exchanging various kinds of information with the access points AR For example, the map DB 21 may be provided by a hard disk drive. The map DB 21 stores map data used in the navigation system 6 together with the area information and the position information of the facility 30 corresponding to information used for identifying the facility 30 (hereinafter, information for identifying the facility is referred to as "facility ID").

For example, the storage 23 is provided by a nonvolatile memory and stores a program performed by the controller 22 according to the present embodiment.

The controller 22 includes a microcomputer 22*a* and a measuring circuit 22*b*. The microcomputer 22*a* includes a CPU, ROM, and RAM. The measuring circuit 22*b* measures the radio field strength (reception strength) when communication unit CR receives a wireless signal transmitted from the access point AR The microcomputer 22*a* performs an assistance information reception process (to be described later) based on a program stored in the storage 23.

The facility-side device 3 includes a network interface (hereinafter referred to as a "network IF") 31, a timer 32, a controller 33, and a storage 34 in addition to the access point AP described above. The network IF 31 provides a connection to the Internet network. The timer 32 measures the time elapsed after the access point AP transmits a facility ID toward outside. The controller 33 includes a microcomputer 33*a*. The storage 34 stores a program performed by the controller 33. The microcomputer 33*a* performs an assistance information transmission process described below based on a program stored in the storage 34.

<Assistance Information Transmission Process>

Figure 3:
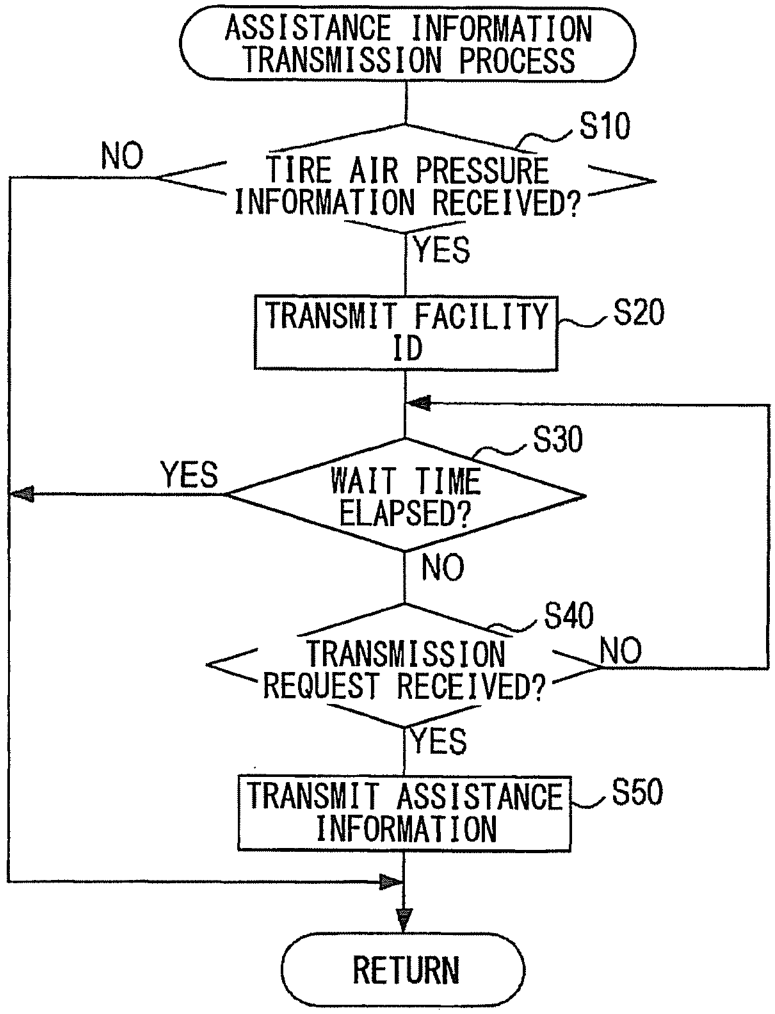
FIG. 3 is a flowchart illustrating an assistance information transmission process performed by the facility-side device.

When the assistance information transmission process as illustrated in FIG. 3 starts, the microcomputer 33*a* in the facility-side device 3 proceeds to S10 and determines whether or not tire air pressure information is received via the access point AP. If determining that the tire air pressure information is received (S10; YES), the microcomputer 33*a* proceeds to S20. If determining that the tire air pressure information is not received (S10; NO), the microcomputer enters a wait state.

At S20, the microcomputer 33*a* transmits a wireless signal to the outside from the access point AR The wireless signal contains the facility ID of the facility 30 to which the facility-side device 3 is installed.

At S30, the microcomputer 33*a* determines whether or not the elapsed time (after transmission of the facility ID from the access point AP to the outside at S20) measured by the timer 32 exceeds a predetermined wait time. If determining that the elapsed time exceeds the predetermined wait time (S30; YES), the microcomputer 33*a* returns to S10. If determining that the elapsed time does not exceed the predetermined wait time (S30; NO), the microcomputer 33*a* proceeds to S40.

At S40, the microcomputer 33*a* determines whether a transmission request for the assistance information is received via the access point AP from the vehicular assistance device 2. If determining that the request for transmitting the assistance information is received (S40; YES), the microcomputer 33*a* proceeds to S50. If determining that the request for transmitting the assistance information is not received (S40; NO), the microcomputer 33*a* returns to S30.

A user ID is contained in the request for transmitting the assistance information which is received at S40. At S50, the microcomputer 33*a* wirelessly transmits the assistance information associated with the user ID to the vehicular assistance device 2 and returns to S10. According to the present embodiment, the microcomputer 33*a* transmits an instruction to the center server 4*a* connected to the Internet network via the network IF 31 in order to wirelessly transmit the assistance information associated with the user ID, which is received at S30, to the vehicular assistance device 2. The instruction contains the facility ID of the facility 30 where the facility-side device 3 is installed. When receiving the instruction, the center server 4*a* selects assistance information appropriate to the user ID out of the assistance information corresponding to the facility ID. For example, the assistance information appropriate to the user ID includes information to provide a special parking space for a leading customer or information from a shop suited for user preferences extracted from the special benefit information or the Internet usage history. Based on user information corresponding to the user ID, the center server 4*a* transmits the selected assistance information to the mobile communication unit MC of the vehicular assistance device 2.

<Assistance Information Reception Process>

Figure 4:
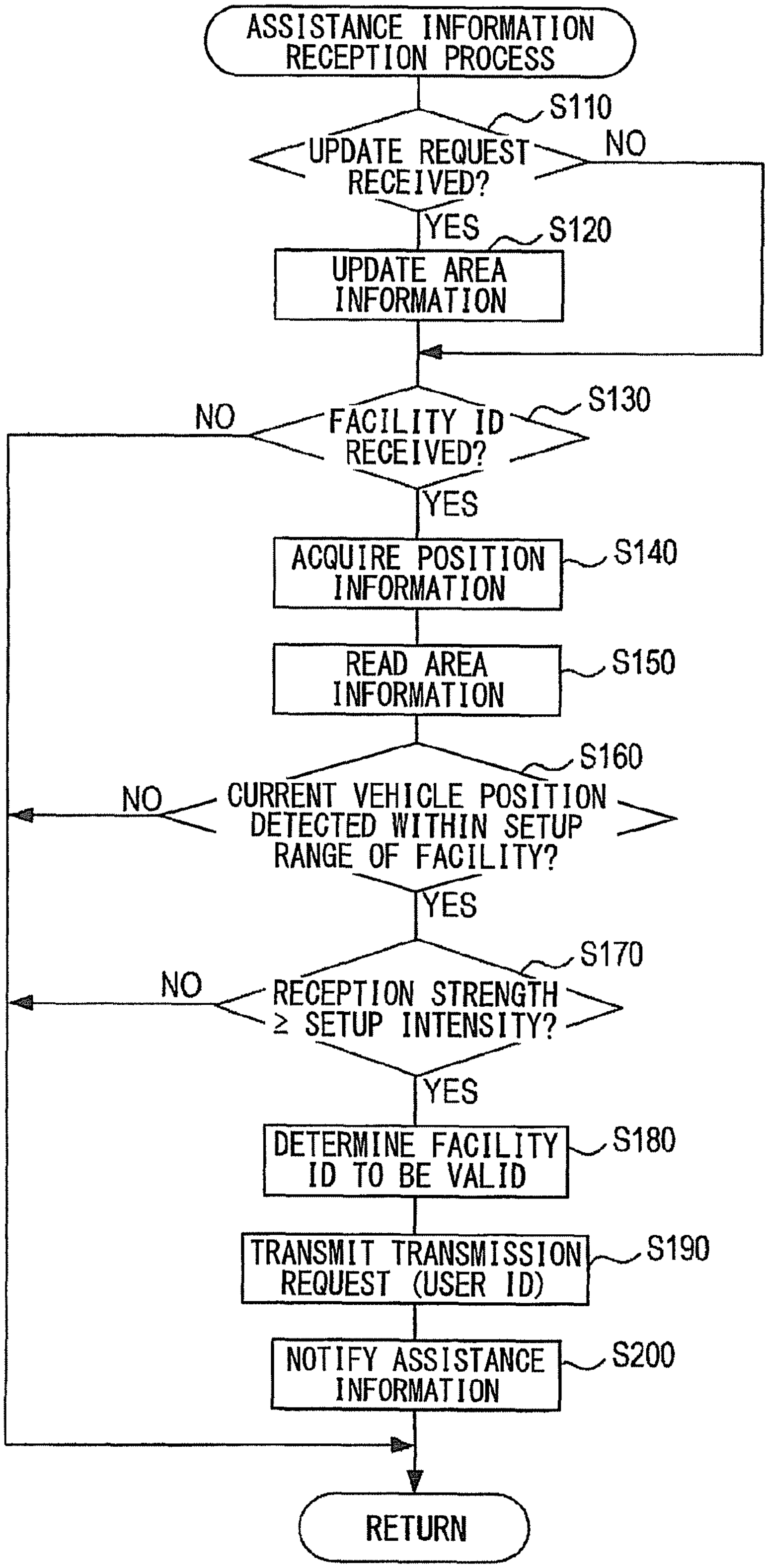
FIG. 4 is a flowchart illustrating an assistance information reception process performed by the vehicular assistance device.

With reference to FIG. 4, the description below explains the assistance information reception process performed by the microcomputer 22*a* of the vehicular assistance device 2.

The assistance information reception process starts as illustrated in FIG. 4. At S110, the microcomputer 22*a* of the vehicular assistance device 2 determines whether or not an update request is received from the center server 4*a* via mobile communication unit MC. If determining that the update request is received (S110; YES), the microcomputer 22*a* proceeds to S120. If determining that the update request is not received (S110; NO), the microcomputer 22*a* proceeds to S130.

At S120, the microcomputer 22*a* transmits a transmission request, which request for the transmitting of the updated area information, to the center server 4*a* via mobile communication unit MC. In response to the request, the center server 4*a* transmits the area information (containing the facility ID). The microcomputer 22*a* receives the area information via mobile communication unit MC and uses the received area information to update the area information (corresponding to the received facility ID) stored in the map DB 21.

At S130, the microcomputer 22*a* determines whether or not communication unit CR receives a wireless signal containing the facility ID from the access point AR If determining that the facility ID is received (S130: YES), the microcomputer 22*a* proceeds to S140. If determining that the facility ID is not received (S130; NO), the microcomputer 22*a* returns to S110.

At S140, the microcomputer 22*a* outputs, to the navigation system 6, a request for acquiring the position information of the vehicle 20 from the navigation system 6.

At S150, the microcomputer 22*a* reads, from the map DB 21, the area information corresponding to the facility ID received at S130.

At S160, the microcomputer 22*a* determines whether or not the detected current position of the vehicle 20 is included in the setup range indicated by the area information, based on the position information acquired at S140 and the area information read at S150. If determining that the vehicle 20 is positioned within the setup range (S160; YES), the microcomputer 22*a* proceeds to S170. If determining that the vehicle 20 is positioned outside the setup range (S160; NO), the microcomputer 22*a* returns to S110.

At S170, the microcomputer 22*a* reads out, from the measuring circuit 22*b*, the reception strength of the wireless signal received at S130, and determines whether or not the reception strength is stronger than or equal to a predetermined setup intensity, based on the area information read at S150. When determining that the reception strength is stronger than or equal to the setup intensity (S170; YES), the microcomputer 22*a* proceeds to S180. If determining that the reception strength is weaker than the setup intensity (S170; NO), the microcomputer 22*a* returns to S110.

The setup intensity is predetermined based on a predetermined distance (see FIG. 1B) and is used as a second index to determine whether or not the current position of the vehicle 20 is detected within the setup range indicated by the area information. The relation between the reception strength and the distance (between access point AP and the vehicle 20) varies with each vehicle 20 or situations around the vehicle 20. To suppress the variation, for example, the microcomputer 22*a* may variably set the setup intensity or correct the reception strength based on the radio field strength (the strength of a radio wave received from a base station) of mobile communication unit MC.

At S180, the microcomputer 22*a* determines that the facility ID received at S130 is valid ID.

At S190, the microcomputer 22*a* allows communication unit CR to externally transmit a wireless signal containing the user ID as a request to transmit the assistance information.

At S200, the microcomputer 22*a* allows communication unit CR to receive the assistance information from the facility-side device 3. The microcomputer 22*a* outputs an instruction to notify a user of the received assistance information on the navigation system 6 and returns to S110. A display device or an audio output device included in the navigation system 6 notifies the user of the assistance information.

<Effects>

In the above-described parking area system 1 according to the present embodiment, when the vehicular assistance device 2 receives, from the access point AP, a facility ID used for identifying the facility 30 to which the facility-side device 3 is installed, the vehicular assistance device 2 determines whether or not the facility ID is valid, based on the area information related to the facility 30 corresponding to the facility ID and the position information of the vehicle 20. The vehicular assistance device 2 transmits a request (containing user ID) for transmitting the assistance information to access point AP under a condition that the facility ID is determined to be valid.

Suppose that an invalid access point (unauthorized access point) transmits a facility ID to the vehicular assistance device 2. In this case, the position of the facility 30 based on the facility ID may be determined to differ from the current position of the vehicle 20 in the vehicular assistance device 2. In such a case, the vehicular assistance device 2 does not transmit the request (containing user ID) for transmitting the assistance information to the unauthorized access point. This can prevent the information from leaking to an unauthorized third party.

The parking area system 1 determines whether a facility ID is valid or not when the vehicular assistance device 2 determines that the current position of the vehicle 20 is detected within the setup range containing the position of the facility 30 based on the facility ID. The vehicular assistance device 2 does not transmit a request (containing user ID) for transmitting the assistance information to any one unauthorized access point outside the setup range. This can appropriately prevent the information from leaking to a third party.

The vehicular assistance device 2 determines whether or not the reception strength of a wireless signal transmitted from access point AP is stronger than or equal to the setup intensity. The parking area system 1 determines the facility ID to be invalid when the reception strength is weaker than the setup intensity. The parking area system 1 double-checks the determination whether or not the current position of the vehicle 20 is detected within the setup range, namely, based on the determination using the position information of the vehicle 20 and the determination using the reception strength of a wireless signal. This can mutually complement errors differing in both determinations and consequently improve the accuracy to determine the facility ID.

The parking area system 1 predetermines the area information indicating the setup range or the setup intensity for each facility 30. The area information is stored in the center server 4*a* on the Internet and is delivered to the vehicular assistance device 2 each time the area information is updated. Thus, the manager of the facility 30 can easily change the area information, improving the degree of freedom in settings.

The parking area system 1 detects the vehicle 20 by using TPMS installed to the vehicle 20 and allowing access point AP to receive the tire air pressure information which is always transmitted from sensor transmitter SS. Thus, there is no need to add an additional configuration to the facility-side device 3 of the parking area system 1 as an image sensor for detecting the vehicle 20 that approaches the facility 30.

In the present disclosure, the process at S130 performed by the microcomputer 22*a* functions as a facility ID reception portion. The process at S120 and S150 performed by the microcomputer 22*a* functions as an area information acquisition portion. The process at S140 performed by the microcomputer 22*a* functions as a position information acquisition portion. The process at S160 through S180 performed by the microcomputer 22*a* functions as a determination portion. The process at S190 performed by the microcomputer 22*a* functions as a user ID transmission portion.

It is noted that a flowchart or the processing of the flowchart in the present disclosure includes sections (also referred to as steps), each of which is represented, for instance, as S10. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Moreover, the present disclosure may be configured as a program product that is stored in a durable and tangible computer-readable storage medium and can be distributed to the market. The program product contains instructions that are executed by a computer and allows the computer to function as the facility ID reception portion S130, the area information acquisition portion S120 and S150, the position information acquisition portion S140, the determination portion S160 through S180, and the user ID transmission portion S190 included in the vehicular assistance device 2 according to a first aspect.

The program product can be installed in one or more computers and can provide effects similar to the effects provided by the vehicular assistance device according to the present disclosure. The program product according to the present disclosure is stored in ROM or flash memory of the computer and may be loaded into the computer from the ROM or the flash memory or may be loaded into the computer via a network.

The program product may be recorded on various forms of computer-readable recording media for use. The recording media include portable semiconductor memory (e.g., USB memory).

Furthermore, the present disclosure provides an assistance information reception method. The assistance information reception method includes a facility ID reception step, an area information acquisition step, a position information acquisition step, a determination step, and a user ID transmission step. The facility ID reception step corresponds to the process performed by the facility ID reception portion S130. The area information acquisition step corresponds to the process performed by the area information acquisition portion S120 and S150. The position information acquisition step corresponds to the process performed by the position information acquisition portion S140. The determination step corresponds to the process performed by the determination portion S160 through S180. The user ID transmission step corresponds to the process performed by the user ID transmission portion S190. The use of this method can provide effects similar to the effects provided by the system 1 including the vehicular assistance device 2 according to the present disclosure.

<Other Embodiments>

While there has been described the embodiment of the present disclosure, the present disclosure is not limited to the above-mentioned embodiment but is applicable to various modes within the spirit and scope of the present disclosure.

In the parking area system 1 according to the above embodiment the microcomputer 22*a* in the vehicular assistance device 2 reads the area information stored in the map DB 21 and determines whether or not the current position of the vehicle 20 belongs to the setup range of the facility 30 as an example. It should be understood that the present disclosure is not limited thereto.

Specifically, the area information need not be stored in the map DB 21. The microcomputer 22*a* may acquire the area information corresponding to the facility ID (received from access point AP) from the center server 4*a* via mobile communication unit MC each time the determination is performed.

Specifically, the area information need not always indicate the setup range and the setup intensity. For example, the area information may simply indicate a position (position information) of the facility 30. In this case, the microcomputer 22*a* may compare the position information of the vehicle 20 with the position information of the facility 30 corresponding to the facility ID (received from access point AP) and may determine whether the vehicle 20 is within a predetermined distance from the facility 30.

In the parking area system 1 according to the above embodiment, the center server 4*a* transmits assistance information to the vehicular assistance device 2. It should be understood that the present disclosure is not limited thereto. The facility-side device 3 may directly transmit assistance information to the vehicular assistance device 2. The method to directly transmit the assistance information from the facility-side device 3 to the vehicular assistance device 2 may use Near Field Communication based on access point AP or provide a mobile communication unit for the facility-side device 3 and allow the mobile communication unit to use the wireless communication.

The above embodiment has described the parking area system 1 as a system including the vehicular assistance device 2. It should be understood that the present disclosure is not limited thereto. For example, the system may be used for an airport instead of the shopping mall. The system may be also used for a shop with no parking area being provided.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicular assistance device equipped to a vehicle, wherein the vehicular assistance device performs a wireless communication with a facility-side device that transmits assistance information useful to a user and the vehicular assistance device receives the assistance information from the facility-side device, the vehicular assistance device comprising:

a facility ID reception portion receiving a facility ID from the facility-side device, the facility ID being used for identifying a facility to which the facility-side device is installed;

an area information acquisition portion acquiring area information related to a position of the facility;

a position information acquisition portion acquiring position information of the vehicle;

a determination portion, when the facility ID reception portion receives the facility ID from the facility-side device, determining whether the received facility ID is valid or not based on the position information of the vehicle and the area information that is related to the position of the facility corresponding to the received facility ID; and a user ID transmission portion, under a condition that the determination portion determines that the received facility ID is valid, transmitting, to the facility-side device, a user ID as a request for transmitting the assistance information, the user ID being used for identifying the user.

2. The vehicular assistance device according to claim 1, wherein the area information indicates a setup range including the position of the facility, and the determination portion determines that the facility ID is valid when the vehicle is positioned within the setup range.

3. The vehicular assistance device according to claim 2, wherein the setup range is predetermined for the facility, the area information is stored in a server provided on an internet, and the area information acquisition portion acquires the area information which is updated in the server.

4. The vehicular assistance device according to claim 2, wherein the determination portion determines that the facility ID is invalid when a reception strength of a wireless signal transmitted from the facility-side device is weaker than a setup intensity.

5. The vehicular assistance device according to claim 4, wherein the setup intensity is predetermined corresponding to the facility, the area information indicates the setup range and the setup intensity which are stored in a server provided on an internet, and the area information acquisition portion acquires the area information which is updated in the server.

6. The vehicular assistance device according to claim 1, further comprising:

a tire air pressure information transmission portion transmitting, to the facility-side device, tire air pressure information as a request for transmitting the facility ID, the tire air pressure information including a pressure of a tire of the vehicle.

7. A program product stored in a non-transitory tangible computer readable storage medium and comprising instructions performed by a computer for controlling the computer to function as the facility ID reception portion, the area information acquisition portion, the position information acquisition portion, the determination portion, and the user ID transmission portion according to claim 1.

8. An assistance information reception method which enables a vehicular assistance device equipped to a vehicle to perform a wireless communication with a facility-side device, wherein the facility-side device transmits assistance information useful to a user and the vehicular assistance device receives the assistance information from the facility-side device, the assistance information reception method comprising:

receiving a facility ID from the facility-side device, the facility ID being used for identifying a facility to which the facility-side device is installed;

acquiring area information related to a position of the facility;

acquiring position information of the vehicle;

when the facility ID is received from the facility-side device, determining whether the received facility ID is valid or not based on the position information of the vehicle and the area information that is related to the position of the facility corresponding to the received facility ID; and under a condition that the received facility ID is determined to be valid, transmitting, to the facility-side device, a user ID as a request for transmitting the assistance information, the user ID being used for identifying the user.

* * * * *